United States Patent
Prokudin et al.

(10) Patent No.: US 11,663,363 B2
(45) Date of Patent: *May 30, 2023

(54) SYSTEM AND METHOD OF DETECTING A FALSE POSITIVE OUTCOME IN CLASSIFICATION OF FILES

(71) Applicant: AO Kaspersky Lab, Moscow (RU)

(72) Inventors: Sergey V. Prokudin, Moscow (RU); Alexander S. Chistyakov, Moscow (RU); Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,316

(22) Filed: Feb. 15, 2022

(65) Prior Publication Data

US 2022/0171880 A1  Jun. 2, 2022

Related U.S. Application Data

(63) Continuation of application No. 16/567,391, filed on Sep. 11, 2019, now Pat. No. 11,288,401.

(51) Int. Cl.
*G06F 21/00* (2013.01)
*G06F 21/64* (2013.01)
(Continued)

(52) U.S. Cl.
CPC ............ *G06F 21/64* (2013.01); *G06F 16/137* (2019.01); *G06F 21/565* (2013.01); *G06F 2221/033* (2013.01)

(58) Field of Classification Search
CPC ............ G06F 2221/033; G06F 21/565; G06F 16/137; G06F 21/64
(Continued)

(56) References Cited

U.S. PATENT DOCUMENTS 8,087,086 B1 * 12/2011 Lai .................... G06F 21/56
726/24
8,561,180 B1 * 10/2013 Nachenberg .......... G06F 21/562
726/22

(Continued)

OTHER PUBLICATIONS

Pryde Jayson et al: "Dynamic Whitelisting Using Locality Sensitive Hashing", Nov. 21, 2018 (Nov. 21, 2018), ROBOCUP 2008: ROBOCUP 2008: Robot Soccer World Cup XII; [Lecture Notes in Computer Science; Lect.Notes Computer], Springer International Publishing, Cham, pp. 181-185.

*Primary Examiner* — Josnel Jeudy
(74) *Attorney, Agent, or Firm* — ArentFox Schiff LLP; Michael Fainberg (57) ABSTRACT

A method for detecting a false positive outcome in classification of files includes, analyzing a file to determine whether or not the file is to be recognized as being malicious, analyzing a file to determine whether a digital signature certificate is present for the file, in response to recognizing the file as being malicious; comparing the digital certificate of the file with one or more digital certificates stored in a database of trusted files, in response to determining that the digital signature certificate is present for the file; and detecting a false positive outcome if the digital certificate of the file is found in the database of trusted files, when the false positive outcome is detected, excluding the file from further determination of whether the file is malicious and calculating a flexible hash value of the file.

21 Claims, 3 Drawing Sheets

(51) Int. Cl.
*G06F 16/13* (2019.01)
*G06F 21/56* (2013.01)

(58) Field of Classification Search
USPC .......................................................... 726/23
See application file for complete search history.

(56) References Cited

U.S. PATENT DOCUMENTS

| | | | |
|---|---|---|---|
| 9,171,152 B1* | 10/2015 | Wilhelm | G06F 21/552 |
| 9,349,006 B2 | 5/2016 | Zhou et al. | |
| 9,781,151 B1 | 10/2017 | McCorkendale et al. | |
| 10,162,967 B1 | 12/2018 | Oliver | |
| 2011/0173698 A1* | 7/2011 | Polyakov | G06F 11/0748 |
| | | | 726/23 |
| 2020/0287914 A1* | 9/2020 | Swanson | G06F 16/137 |
| 2021/0157915 A1* | 5/2021 | Pizano | G06F 21/563 |

\* cited by examiner

SYSTEM AND METHOD OF DETECTING A FALSE POSITIVE OUTCOME IN CLASSIFICATION OF FILES

CROSS REFERENCE TO RELATED APPLICATIONS

This application is a continuation of prior U.S. patent application Ser. No. 16/567,391, filed on Sep. 11, 2019.

FIELD OF TECHNOLOGY

The present disclosure relates to the field of file classification, more specifically to systems and methods for detecting a false positive outcome in classification of files.

BACKGROUND

Computing devices—smartphones, computers, tablets, and so on—have become an essential attribute of almost every person's daily experience. With the help of such devices, people perform a multitude of everyday tasks: from exchanging emails to paying for purchases in stores. The widespread use of such devices motivates criminals to create malicious programs, especially those designed for unlawful access to user data, and also to the resources of the computing device as a whole.

At present, antivirus applications are widely used in the fight against malicious programs. The antivirus applications are programs designed to detect malicious programs and protect computing devices against those malicious programs. Various approaches and technologies are used to provide such protection: signature analysis, behavioral analysis, heuristic rules, and so forth. Yet as the antivirus technologies develop, criminals are also improving the ways of getting around these defense mechanisms. Thus, the development of antivirus technologies is always an urgent task, the goal of which is to enhance the quality of detection of malicious programs—to reduce the errors of the first and second kind in the detection of malicious programs.

To enhance the quality of detection of malicious programs, classifying models obtained as a result of machine learning are being used increasingly and often. Such models identify all possible attributes (information about the compilers used in creating the applications, information about the sizes of the executable files, sets of machine instructions, and so on) from the applications being analyzed, especially the executable files (such as PE files), and on the basis of these tags assign the application being analyzed to one of the classes of applications; accordingly, the detection of a malicious application is carried out by assigning the analyzed application to the class of malicious applications. However, classification algorithms that may not be bad at detecting malicious applications may still need improvement in other characteristics. For example, the number of false positives (or other metrics that are based on the number of false positives) of an algorithm are important characteristics of the detection algorithm. Current classification algorithms generally rely on a serial process in which the detection algorithm is first designed, then applied, and at a later time improved based on a further analysis. This approach has its shortcomings. The number of false positives may remain too high for an extended length of time.

Hence, there is a need to create a solution which could eliminate these shortcomings and improve the quality of detection of malicious programs.

SUMMARY

Aspects of the disclosure relate to the field of computer security, more specifically to systems and methods for detecting a false positive outcome in classification of files. The method of the present disclosure overcomes the shortcomings of the existing approaches by performing the detection of malicious files and the reduction of false positives simultaneously—thereby improving the quality of detection of malicious programs.

In one exemplary aspect, a method is implemented in a computer comprising a hardware processor, the method comprising: analyzing a file to determine whether or not the file is to be recognized as being malicious, analyzing a file to determine whether a digital signature certificate is present for the file, in response to recognizing the file as being malicious; comparing the digital certificate of the file with one or more digital certificates stored in a database of trusted files, in response to determining that the digital signature certificate is present for the file; and detecting a false positive outcome if the digital certificate of the file is found in the database of trusted files, when the false positive outcome is detected, excluding the file from further determination of whether the file is malicious and calculating a flexible hash value of the file.

According to one aspect of the disclosure, a system is provided for detecting a false positive outcome in classification of files, the system comprising a hardware processor configured to: analyze a file to determine whether or not the file is to be recognized as being malicious, analyze a file to determine whether a digital signature certificate is present for the file, in response to recognizing the file as being malicious; compare the digital certificate of the file with one or more digital certificates stored in a database of trusted files, in response to determining that the digital signature certificate is present for the file; and detect a false positive outcome if the digital certificate of the file is found in the database of trusted files, when the false positive outcome is detected, exclude the file from further determination of whether the file is malicious and calculating a flexible hash value of the file.

In one exemplary aspect, a non-transitory computer-readable medium is provided storing a set of instructions thereon for detecting a false positive outcome in classification of files, wherein the set of instructions comprises instructions for: analyzing a file to determine whether or not the file is to be recognized as being malicious, analyzing a file to determine whether a digital signature certificate is present for the file, in response to recognizing the file as being malicious; comparing the digital certificate of the file with one or more digital certificates stored in a database of trusted files, in response to determining that the digital signature certificate is present for the file; and detecting a false positive outcome if the digital certificate of the file is found in the database of trusted files, when the false positive outcome is detected, excluding the file from further determination of whether the file is malicious and calculating a flexible hash value of the file.

In one aspect, the determination of whether or not files are malicious is performed on a predetermined number of unique files using a single record that includes at least the calculated flexible hash value.

In one aspect, the flexible hash value of the file comprises a file hash value calculated based on data stored in the file, and wherein the flexible hash value remains unchanged upon partial changing of the data stored in the file.

In one aspect, the method further comprises storing the calculated flexible hash value in a database of exceptions.

In one aspect, the method further comprises: excluding a group of files from further determination of whether the file is malicious, in response to determining that each file in the group of files has calculated flexible hash value found in the database of exceptions.

In one aspect, the file is recognized as being malicious using one of the following classifiers: a decision tree, gradient boosting, random forest and a neural network.

In one aspect, the method further comprises: recognizing the file excluded from being scanned as being trusted.

The classification of files in accordance with the teachings of the present disclosure allows for detection of malicious files while simultaneously reducing the number of false positives—thereby providing an improvement in computer security.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for reducing false positives in classification of files. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

As an introduction, a number of definitions and concepts that are used in describing aspects of the disclosure are provided below.

A malicious application is an application able to cause harm to a computing device or to the data of the user of the computing device (in other words, a computer system: personal computer, server, mobile telephone, and so on), such as: an Internet worm, a keylogger, a computer virus. The harm caused may be unlawful access to the resources of the computer, including the data being kept on the computer, for the purpose of theft, as well as unlawful use of the resources, including for storage of data, performing computations, and so on.

A trusted application is an application which does not cause harm to a computer or to the user thereof. A trusted application can include an application which has been developed by a trusted software manufacturer, downloaded from a trusted source (such as a site listed in a database of trusted sites), or an application the identifier (or other data which can be used to uniquely identify the application) of which (such as the hash sum of the application file) is kept in a database of trusted applications. The identifier of the manufacturer, such as a digital certificate, may also be kept in the database of trusted applications.

An untrusted application is an application which is not trusted, but also not recognized as malicious, for example, with the aid of an antivirus application. Furthermore, an untrusted application may afterwards be recognized as malicious, for example, with the aid of an antivirus scan.

A malicious file is a file which is a component of a malicious application and which contains program code (executable or interpretable code).

An untrusted file is a file which is a component of an untrusted application and which contains program code (executable or interpretable code).

A trusted file is a file which is a component of a trusted application.

The predetermined application categories are at least the category of trusted applications, the category of untrusted applications, and the category of malicious applications.

A flexible hash ("similarity preserving hash"[1], especially a "locality sensitive hash[2]") is a file hash calculated on the basis of data stored in a file, and the value of which will remain unchanged upon partial changing of that data.

[1] Sparse similarity-preserving hashing, Jonathan Masci et al., https://arxiv.org/pdf/1312.5479.pdf
[2] Locality Sensitive Hashing, Ravi Kumar, https://users.soe.ucsc.edu/~niejiazhong/slides/kumar.pdf In one aspect, the calculation of a flexible hash additionally makes use of data obtained by processing data stored in the file. For example, the data used to calculate the flexible hash may include records of function calls obtained from the execution log of the file. The execution log of the file may be populated and/or obtained by any standard method, during either the execution of the file or an emulation of the execution of the file. In one aspect, the flexible hash may be obtained in a form of a vector of values.

In one aspect, a flexible hash is a hash which will have an identical value for two similar files (the values of the flexible hashes calculated on the basis of the attributes of the files match up). The flexible hash of a group of files (a flexible hash corresponding to a group of files) includes a flexible hash, the value of which is the same for each file of that group. Files with a matching value of the flexible hash, especially the files from such a group, may be considered similar with a certain accuracy (accuracy in the present context can be taken to include a mean or a root mean square value of a degree of similarity, for example between every two files of that group), which is determined by the accuracy of the method for computing the flexible hash itself We shall consider two files to be similar if the degree of similarity between them is greater than a previously established threshold (for example, greater than 85%, in other words greater than 0.85). The degree of similarity may be computed with the aid of any known method, such as those based on calculating the: Jacquard, Dyce, Levenshtein, Hemming, and other measures.

False positive refers to a statistical term in which a true null hypothesis is rejected. That is, false positive refers to Type I errors. For example, the null hypothesis may be a hypothesis that states given files are not malicious. Suppose, the given files are actually not malicious. Then, if the files are erroneously recognized as being malicious, the "true" null hypothesis is rejected and a false positive event occurs.

It is noted that the system for reducing false positives in classification of files described in the present invention comprises actual devices, systems, components, and groups of components, realized with the use of hardware such as integrated microcircuits (application-specific integrated circuit, ASIC) or a field-programmable gate array (FPGA) or, for example, in the form of a combination of software and hardware such as a microprocessor system and a set of program instructions, and also based on neurosynaptic chips. The functionality of the system of the present disclosure may be realized exclusively by hardware, and also in the form of a combination, where some of the functionality of the system is realized by software and some by hardware. In certain aspects, some or all of the operations of the system can be implemented on a processor of a general-purpose computer (such as the one depicted in FIG. 3). Furthermore, the components of the system may be realized within a single computing device or distributed among several interconnected computing devices.

Figure 1:
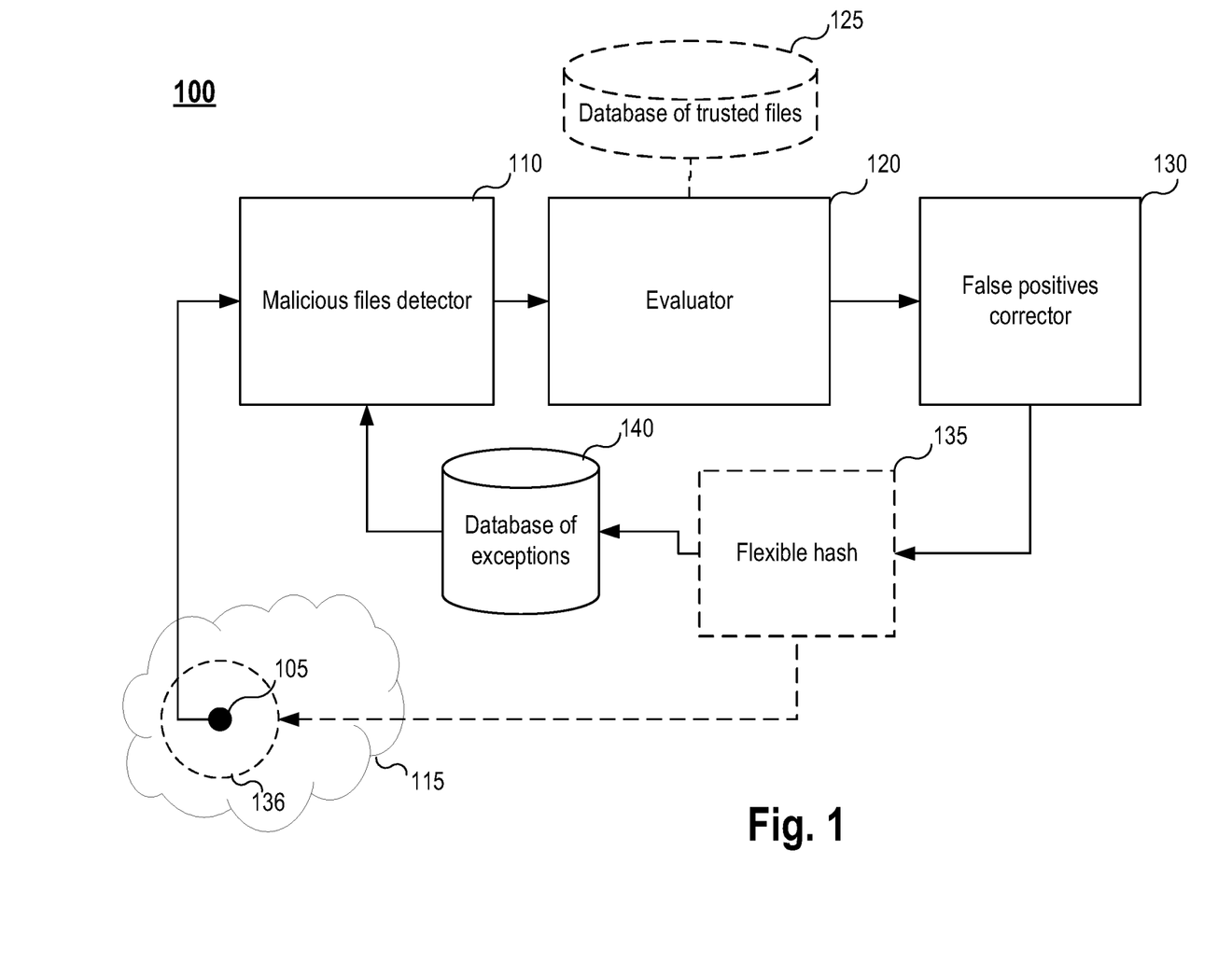
FIG. 1 is a block diagram illustrating an exemplary system for reducing false positives in classification of files in accordance with aspects of the present disclosure.

FIG. 1 is a block diagram illustrating an exemplary system 100 for reducing false positives in classification of files in accordance with aspects of the present disclosure. The present system includes the following: a malicious files detector 110, an evaluator 120, a false positives corrector 130, and a database of exceptions 140. In one aspect, the system 100 further comprises a database of trusted files 125.

In one aspect, all the components of the system are situated on the computing device of the user or client (such as the personal computer of a user). In another aspect, all the components of the system are situated on a remote server. In yet another aspect, the malicious files detector 110 and the database of exceptions 140 are situated on the computing device of the user, while the evaluator 120 and the false positives corrector 130 are situated on the server device. In yet another aspect, the malicious files detector 110, the database of exceptions 140 and the evaluator 120 are situated on the computing device of the client, while the false positives corrector 130 is situated on the server device. In yet another aspect, the evaluator 120 is situated on the server device, while the other components of the system are situated on the computing device of the client. In yet another aspect, all of the components of the system (i.e., the malicious files detector 110, the evaluator 120, the false positives corrector 130, and the database of exceptions 140) are situated on a remote server, while a proxy agent is situated on the computing device of the client, wherein the proxy agent is used to transmit, to the remote server, all the data needed for the operations of the malicious files detector 110, the evaluator 120, the false positives corrector 130, and the database of exceptions 140.

In one aspect, the malicious files detector 110 is designed to detect malicious files. It should be noted that malicious files are a particular instance of the category of files having the common characteristic that the files of this category may inflict harm on a computing device or the user of the computing device. It is noted that the method and system of the present disclosure may be used for malicious files, or files of any other category. In other words, "malicious files" may be one such category. In one aspect, the category is a category of undesirable files, such as those related to undesirable software, advertising software (adware), software altering the settings of other applications (e.g., altering the start page of a browser).

For ease of understanding, the method of the present disclosure is described below by way of an exemplary category that is established for malicious files. For clarity, files that do not belong to this established category of malicious files are referred to as "trusted files." Accordingly, for the exemplary category, the term "false positive" applies when a file is falsely recognized as belonging to the established category of malicious files when the file is not malicious, i.e., the file is trustworthy and thus should be recognized as being a trusted file. In other words, a false positive refers to wrongly recognizing the file as belonging to a certain category (in particular, the class of malicious files), when the file does not belong to that category (in particular, the file belongs to the category of trusted files).

The detecting of a malicious file comprises: analyzing, by the malicious files detector 110, the file, and recognizing the file as being malicious. In one aspect, for recognizing the files as being malicious, the malicious files detector 110 employs any method ordinarily known by those skilled in the art of data security. In one aspect, in order to identify a file as malicious, the malicious files detector 110 may employ any method ordinarily known by those skilled in the art of data security. However, regardless of the method used to recognize the file as being malicious, the correction of a false positive outcome of the method is a labor-intensive operation; In particular:

the correction of a false positive outcome of that method may require spending a significant amount of time; and/or the correction of a false positive outcome of that method may require sending a significant volume of data through the network.

In one aspect, the amount of time spent correcting the false positive outcome is considered significant when the duration of time spent for the correction of the false positive outcome is greater than an established threshold value for a duration of time, such as 1 hour or more. In one aspect, the volume of data sent for the correction of the false positive outcome is considered significant when the volume of data (sent) is greater than an established threshold value for volume of data, such as 1 Megabyte or more.

In one aspect, the malicious files detector 110 performs the detection on a predetermined number of unique files using a single record (such as a heuristic rule, a flexible hash, and so forth). In other words, the present disclosure has a generalization ability when used for detection of malicious files.

In one aspect, the malicious files detector 110 uses a classifying algorithm for the detecting of the malicious files. The corresponding correction of the false positive outcome (i.e., the correction to reclassify the files which were previously misclassified as being malicious) requires a significant amount of time. The correction includes re-teaching the classification algorithm. Moreover, the re-teaching is not just for one type of file. Rather, the re-teaching includes supporting the generalization ability.

In one aspect, the classification algorithm of the present disclosure includes:
a decision tree;
gradient boosting;
random forest;
classifying algorithms based on neural networks.

It is noted that the teaching and re-teaching of any of the classification algorithms of the present disclosure may be performed using any method ordinarily known in the art of data structures. Thus, the particular teachings and re-teaching techniques are not described in the present disclosure.

Returning to FIG. 1, the malicious files detector 110 may employ a classification algorithm for scanning files and determining whether or not each scanned file is malicious. For example, a group of files 115 is shown in FIG. 1. The group of files 115 includes files for which the malicious files detector 110 is to perform the scanning for the purpose of detecting whether or not the files in the group are malicious. For example, a file 105 of FIG. 1 is one exemplary file of the group of files 115 for which the malicious files detector 110 may employ the classification algorithm to scan and ascertain whether or not the file is malicious.

In one aspect, the group of files 115 may comprise files on the computing device of the user. In another aspect, the group of files 115 may comprise files on a remote server. Thus, the malicious files detector 110 scans the file 105; upon completion of the scan, the malicious files detector 110 recognizes the file 105 either as a malicious file or a non-malicious file. If the file 105 is recognized as being malicious, the malicious files detector 110 sends the file 105 recognized as being malicious (or all necessary information about the file) to the evaluator 120.

Then, the evaluator 120 receives and analyzes the file 105 (or the information about the file 105). The purpose of the analysis is to detect a false positive outcome of the malicious files detector 110, the false positive outcome being an outcome in recognizing the file 105 as being malicious. In other words, the analysis by the evaluator 120 reveals whether or not the malicious files detector 110 erroneously recognized the file 105 as being malicious.

In one aspect, the evaluator 120 uses any approach ordinarily known in the art for detecting a false positive outcome. For example, the evaluator 120 may compare the identifier of the file 105 with identifiers of trusted files. In one aspect, the identifier of the file 105 may comprise a check sum of the file 105 (MD5 or SHA-1, and others).

In one aspect, the identifiers of the trusted files are stored in a database of trusted files 125. In one aspect, the database 125 is situated within the confines of the computing device on which the evaluator 120 is situated. In another aspect, the database 125 and the evaluator 120 are on different computing devices—thereby being considered as remotely situated with respect to each other.

In one aspect, the evaluator 120 detects a false positive outcome when the evaluator 120 determines that an identifier of the file 105 is present in a database of trusted files 125. For example, the malicious files detector 110 detects a given file 105 as being malicious. However, subsequently, the evaluator 120 locates the identifier of the given file 105 in a database of trusted files—thus signifying that the file 105 is erroneously identified as being malicious. In other words, when a trusted file is identified as being malicious, the evaluator 120 detects a false positive outcome. Similarly, the evaluator 120 does not detect a false positive outcome when the evaluator 120 determines that the identifier of the file 105 is not present in the database of trusted files 125.

In one aspect, when a digital signature certificate is present for the file 105, the evaluator 120 compares the certificate of the file 105 with certificates kept in the database of trusted files 125. The evaluator 120 detects a false positive when the certificate with which the file 105 is signed is present in the database 125, and the certificate is valid. Otherwise, the evaluator 120 does not detect a false positive outcome in the file 105 being recognized as being malicious.

In one aspect, the data kept in the database of trusted files 125 may be modified, e.g., by persons with expertise in the field of IT security. In one aspect, the modification may be performed via a remote link. In another aspect, the modification may be performed by a local expert.

In one aspect, when the false positive is detected for a file 105 by the evaluator 120, the evaluator 120 sends the file 105 for which the false positive is detected to a false positives corrector 130.

In one aspect, the false positives corrector 130 calculates a flexible hash 135 of the file received from the evaluator 120, and sends the calculated flexible hash 135 to a database of exceptions 140, as illustrated in FIG. 1. For example, when the file 105 is wrongly recognized as being malicious by the malicious files detector 110, the evaluator 120 may subsequently detect a false positive and send the file to the false positives corrector 130. The false positives corrector 130 may then compute and store the flexible hash of the file 105 in the database of exceptions 140.

In turn, the flexible hashes 135, kept in the database of exceptions 140, may be used by the malicious files detector 110 when performing the scanning of files. Thus, the malicious files detector 110, receives files earmarked to be scanned, for e.g., any file of the group of files 115. Then, the malicious files detector 110 first determines whether or not files earmarked to be scanned are present in the database of exceptions 140. The database of exceptions 140 is populated by the false positives corrector 130 by computing flexible hashes 135 and storing in the database of exceptions 140. Then, when a flexible hash of a file earmarked to be scanned is present in the database of exceptions, the file is excluded from the scanning.

In one aspect, a file earmarked for scanning is subsequently excluded from being scanned when the flexible hash of the file is in a form of a vector of values $[x_1, x_2, x_3 \ldots]$, a flexible hash $[y_1, y_2, y_3 \ldots]$ is found in the database of exceptions, and indices of elements of an I vector are indicated such that at least one of the following conditions is satisfied:

$\forall i \in I: x_i < y_i$, and $\exists K \subset I, \forall \in K: x_i < y_i$.

In one aspect, the file that is excluded from being scanned is recognized as trusted.

Thus, as described above, malicious files detector 110 is able to calculate the flexible hash of the file 105, as well as compare the calculated flexible hash with the hashes kept in the database of exceptions 140 (for example, by comparing the values of the hashes). Moreover, during the repeat scanning of the file 105 by the malicious files detector 110, the file 105 will not be recognized as being malicious. The repeat scanning is performed whenever the malicious files detector 110 is being used.

Returning to FIG. 1, a group of files is schematically designated by a vicinity of the file 105—the region 136, symbolizing a group of files similar to file 105 which are wrongly recognized as being malicious, wherein all of the files in the region 136 are files from among the group of files 115. Thus, the malicious files detector 110 may perform scanning for the group of files 115, and files in region 136 may be files intended to be scanned but having flexible hashes present in the database of exceptions 140. Then, when a false positive outcome of the malicious files detector 110 is identified, all files in region 136 are successfully excluded from the scanning, e.g., the files that match with the flexible hash 135 of the file 105 are excluded from the scanning.

The approach described above enables the system 100 to reduce a number of false positives. For the example described above, changes are made to the algorithm of the malicious files detector 110 such that files previously recognized as being malicious and then subsequently found as being non-malicious are used to improve the algorithm itself. In other words, when (1) a file 105 is initially identified as being malicious by the malicious files detector, (2) a false positive is detected for the file 105 by the evaluator 120, (3) a flexible hash 135 is computed by the false positive corrector 130, and (4) the computed flexible hash of the file 105 is stored in the database of exceptions 140, the algorithm of the malicious files detector 110 is improved such that files similar to the file 105 are not recognized as being malicious—thereby reducing subsequent false positives. The use of the flexible hash 135 for excluding files from the scanning, by the malicious files detector 110, enables the method of the present disclosure to avoid repeat false positive outcomes with respect to the same file 105 for which the flexible hash 135 was computed. In addition, false positive outcomes with respect to files in region 136, which are files similar to file 105. Note that the malicious files detector 110 may not have performed any scans on the files in region 136. However, the malicious files detector 110 may avoid scanning the files in region 136 based on the knowledge gained from the flexible hash 135.

In one aspect, the false positive outcomes with respect to files in region 136 are avoided by recognizing the files in region 136 as being trusted files when the flexible hash 135 is stored in database of exceptions 140.

As described above, the method of the present disclosure reduces the number of false positives. Moreover, the method supports generalizing the improvements in the classification algorithms such that false positives may be eliminated for files even before the files are scanned. For the example of FIG. 1, false positive outcomes may be eliminates for files in region 136 based on knowledge gained from scanning only file 105.

The method of the present disclosure reduces the false positives without requiring a large amount of data to be sent through a network. As such, unlike other method that require either a large amount of data to be sent via the network or a significant amount of time to be spent analyzing each outcome and re-teaching the classifier, the method of the present disclosure reduces the number of false positives while addressing the shortcomings. The method of the present disclosure advantageously corrects the false positives for subsequent scans without requiring a re-teaching of the classifying algorithm.

Figure 2:
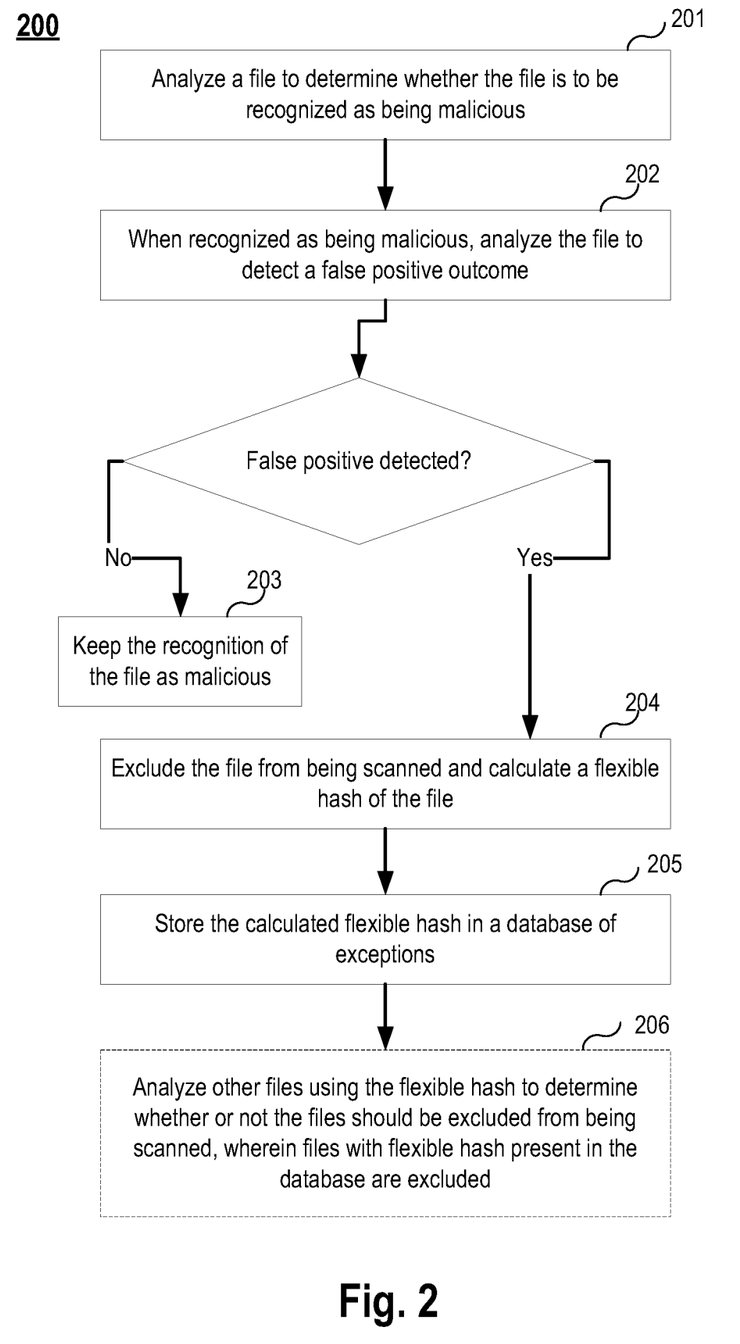
FIG. 2 is a flow diagram of an exemplary method for reducing false positives in classification of files in accordance with aspects of the present disclosure.

FIG. 2 is a flow diagram of an exemplary method 200 for reducing false positives in classification of files in accordance with aspects of the present disclosure. The method of FIG. 2 may be carried out with the aid of the classification system described in conjunction with FIG. 1.

In step 201, the malicious files detector 110 analyzes the file 105 to determine whether or not the file 105 should be recognized as being malicious.

In step 202, when the file 105 is recognized as being malicious, the evaluator 120 analyzes the file 105 (i.e., performs a repeat analysis) to detect a false positive outcome. In other words, the evaluator 120 determines whether or not the malicious files detector 110 erroneously classified the file 105 as being malicious. When the evaluator 120 detects a false positive, the method proceeds to step 203. Otherwise, the method proceeds to step 204.

In step 203, method 200 keeps the recognition of the file 105 as malicious. For example, the decision to recognize the file as being malicious is not changed. The method then proceeds to step 210.

In step 204, method 200, by the false positives corrector 130, excluding the file from being scanned and calculates a flexible hash of the file 105. For example, the flexible hash 135 of the file 105 which was wrongly recognized as being malicious is computed by the false positives corrector 130. The exclusion of the file from being scanned may be performed by recognizing the file as being non-malicious.

Various methods exist for calculating the flexible hash such that the value of this hash coincides for two similar files, such as locality sensitive hashing (LSH), as well as other hash functions formed with the help of supervised learning or partial supervised learning contingent upon satisfying the "similarity preserving" condition—the stability of the hash value against a change in the data used to calculate the hash. Files are considered similar when the computed hashes match.

In one aspect, the false positives corrector 130 is trained via a training module. For example, the training module may gather data from various computing devices. Then, based on initial malicious file designations and subsequent corrections, the training algorithm may be improved such that the false positive corrector 130 is better equipped to identify instances of false positive outcomes of the malicious files detector 110.

In step 205, method 200, stores the calculated flexible hash in a database of exceptions. For example, the flexible hash computed in step 204 is added to the database of exceptions 140.

In one aspect, the adding of the flexible hash 135 to the database of exceptions 140 is performed by the false positives corrector 130. In another aspect, the flexible hashes computed by the false positives corrector 130 are sent to a data security expert. For example, a computing device of the data security expert may gather the flexible hashes. The expert may then analyze the gathered flexible hashes and decide which ones should be added to the database of exceptions 140. In one aspect, the expert may also update rules associated with the file classification algorithms used by the malicious files detector 110.

In step 206, method 200 analyzes other files using the flexible hash to determine whether or not the files should be excluded from being scanned. Files with flexible hash present in the database are excluded. It is noted that the other files may or may not have been previously scanned. Thus, if the flexible hash of some of the files in queue to be scanned, by the malicious files detector 110, are now found in the database of exceptions 140, the scanning is avoided—thereby reducing the number of files to be scanned. For the example of FIG. 1, the flexible hashes of files 115 may be present in the database of exceptions 140. Thus, files 115 may be excluded from further analysis by the malicious files detector 110.

In one aspect, the determination of whether or not files are malicious is performed on a predetermined number of unique files using a single record that includes at least the calculated flexible hash.

In one aspect, the false positive outcome is detected when an identifier of the file matches an identifier of a trusted file.

In one aspect, the detection of the false positive outcome for the file comprises: determining that a digital signature certificate is present for the file, comparing the certificate of the file with certificates of trusted files in a database, and detecting the false positive when a valid certificate with which the file is signed is present in the database.

In one aspect, the method further comprises: recognizing the file excluded from being scanned as being trusted. In one aspect, the method further comprises: identifying other files having a flexible hash that matches the flexible hash of the file for which the false positive is detected, and recognizing the identified other files as being trusted.

In one aspect, the method further comprises: storing files recognized as being trusted in a database accessible by any number of computing systems. In one aspect, files recognized as being trusted are stored in a database (e.g., either in the database of exceptions 140 or some other database). For instance, multiple computing systems of an enterprise may share the list so as to reduce duplicative work.

The method of the present disclosure has advantages over classifiers that have a large number of false positives. Unlike other systems that rely on a serial process to design a detection algorithm, apply the designed algorithm, then analyze the result of the design being applied to improve the algorithm, the method of the present disclosure reduces the false positives as the algorithm is being applied. The present disclosure reduces the number of false positives without an extensive delay. Thus, the use of the present method makes possible: achieving the technical result of increasing the quality of categorization of files by decreasing the number of false positives when detecting malicious files.

Figure 3:
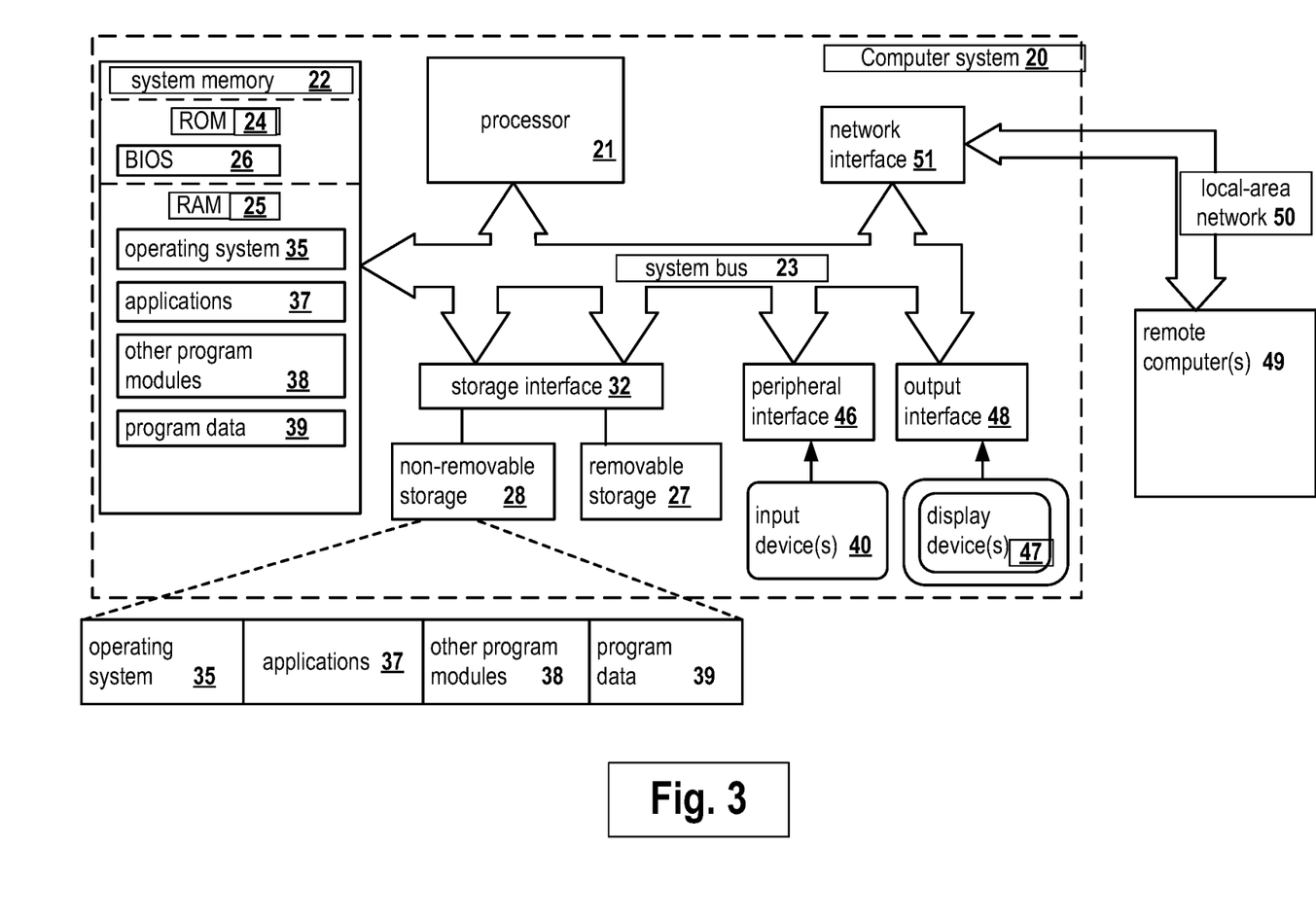
FIG. 3 presents an example of a general-purpose computer system on which aspects of the present disclosure can be implemented.

FIG. 3 is a block diagram illustrating a computer system 20 on which aspects of systems and methods for reducing false positives may be implemented in accordance with an exemplary aspect. It should be noted that the computer system 20 can correspond to a device with an interceptor, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting a false positive outcome in classification of files, the method comprising:
    analyzing a file to determine whether or not the file is to be recognized as being malicious;
    analyzing a file to determine whether a digital signature certificate is present for the file, in response to recognizing the file as being malicious;
    comparing the digital certificate of the file with one or more digital certificates stored in a database of trusted files, in response to determining that the digital signature certificate is present for the file; and
    detecting a false positive outcome when the digital certificate of the file is found in the database of trusted files,
    when the false positive outcome is detected, excluding the file from further determination of whether the file is malicious and calculating a flexible hash value of the file, wherein the flexible hash value remains unchanged upon partial changing of the data stored in the file.

2. The method of claim 1, wherein the determination of whether or not files are malicious is performed on a predetermined number of unique files using a single record that includes at least the calculated flexible hash value.

3. The method of claim 1, wherein the flexible hash value of the file comprises a file hash value calculated based on data stored in the file.

4. The method of claim 1, further comprising storing the calculated flexible hash value in a database of exceptions.

5. The method of claim 4, further comprising excluding a group of files from further determination of whether the file is malicious, in response to determining that each file in the group of files has calculated flexible hash value found in the database of exceptions.

6. The method of claim 1, wherein the file is recognized as being malicious using one of the following classifiers: a decision tree, gradient boosting, random forest and a neural network.

7. The method of claim 1, further comprising recognizing the file excluded from being scanned as being trusted.

8. A system for detecting a false positive outcome in classification of files, comprising:
at least one hardware processor configured to:
analyze a file to determine whether or not the file is to be recognized as being malicious;
analyze a file to determine whether a digital signature certificate is present for the file, in response to recognizing the file as being malicious;
compare the digital certificate of the file with one or more digital certificates stored in a database of trusted files, in response to determining that the digital signature certificate is present for the file; and
detect a false positive outcome when the digital certificate of the file is found in the database of trusted files,
when the false positive outcome is detected, exclude the file from further determination of whether the file is malicious and calculate a flexible hash value of the file, wherein the flexible hash value remains unchanged upon partial changing of the data stored in the file.

9. The system of claim 8, wherein the determination of whether or not files are malicious is performed on a predetermined number of unique files using a single record that includes at least the calculated flexible hash value.

10. The system of claim 8, wherein the flexible hash value of the file comprises a file hash value calculated based on data stored in the file.

11. The system of claim 8, wherein the processor is further configured to store the calculated flexible hash value in a database of exceptions.

12. The system of claim 11, wherein the processor is further configured to:
exclude a group of files from further determination of whether the file is malicious, in response to determining that each file in the group of files has calculated flexible hash value found in the database of exceptions.

13. The system of claim 8, wherein the file is recognized as being malicious using one of the following classifiers: a decision tree, gradient boosting, random forest and a neural network.

14. The system of claim 8, wherein the processor is further configured to:
recognize the file excluded from being scanned as being trusted.

15. A non-transitory computer readable medium storing thereon computer executable instructions for detecting a false positive outcome in classification of files, including instructions for:
analyzing a file to determine whether or not the file is to be recognized as being malicious;
analyzing a file to determine whether a digital signature certificate is present for the file, in response to recognizing the file as being malicious;
comparing the digital certificate of the file with one or more digital certificates stored in a database of trusted files, in response to determining that the digital signature certificate is present for the file; and
detecting a false positive outcome when the digital certificate of the file is found in the database of trusted files,
when the false positive outcome is detected, excluding the file from further determination of whether the file is malicious and calculating a flexible hash value of the file, wherein the flexible hash value remains unchanged upon partial changing of the data stored in the file.

16. The non-transitory computer readable medium of claim 15, wherein the determination of whether or not files are malicious is performed on a predetermined number of unique files using a single record that includes at least the calculated flexible hash value.

17. The non-transitory computer readable medium of claim 15, wherein the flexible hash value of the file comprises a file hash value calculated based on data stored in the file.

18. The non-transitory computer readable medium of claim 15, wherein the instructions further include instructions for:
storing the calculated flexible hash value in a database of exceptions.

19. The non-transitory computer readable medium of claim 18, wherein the instructions further include instructions for:
excluding a group of files from further determination of whether the file is malicious, in response to determining that each file in the group of files has calculated flexible hash value found in the database of exceptions.

20. The non-transitory computer readable medium of claim 15, wherein the file is recognized as being malicious using one of the following classifiers: a decision tree, gradient boosting, random forest and a neural network.

21. The non-transitory computer readable medium of claim 15, wherein the instructions further include instructions for:
recognizing the file excluded from being scanned as being trusted.

* * * * *